Figure 20:
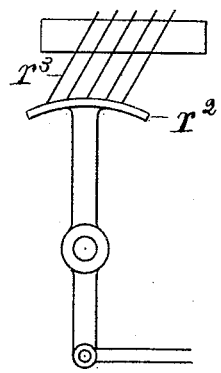

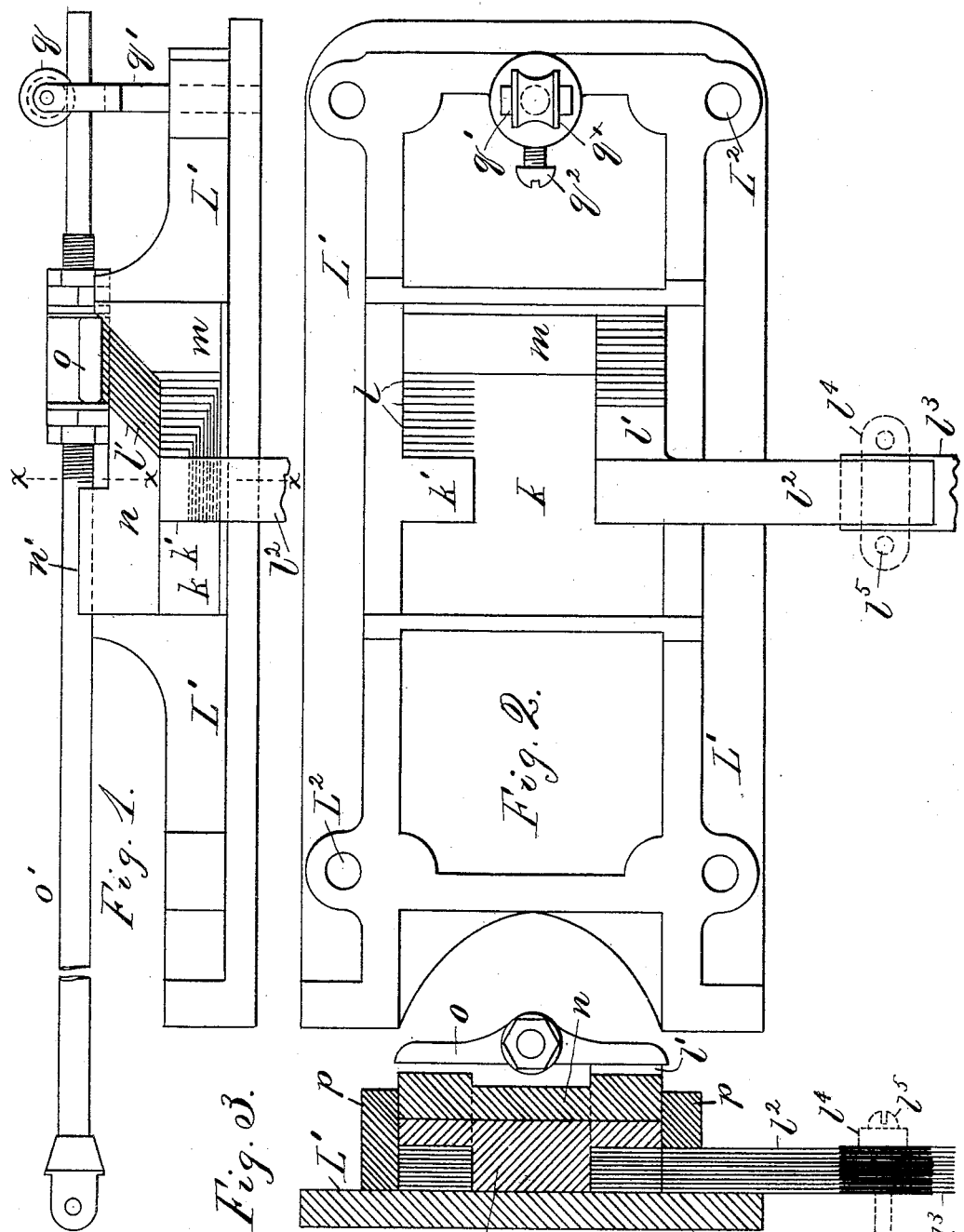

(Model.)
W. BAXTER, Jr.
ELECTRIC SHUNTING DEVICE.
3 Sheets—Sheet 2.
No. 384,116.   Patented June 5, 1888.
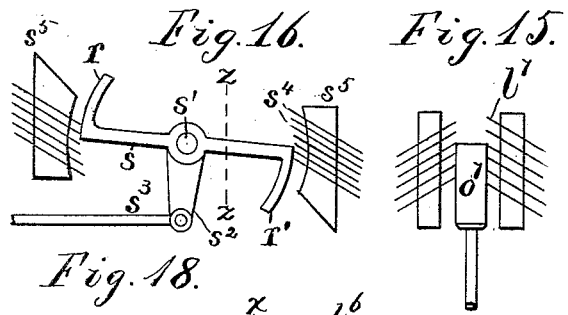
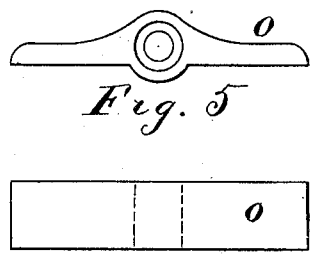
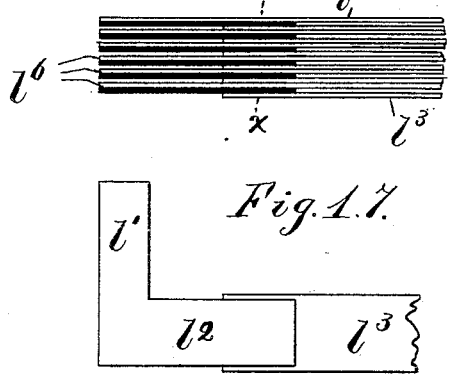
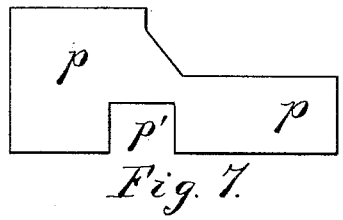
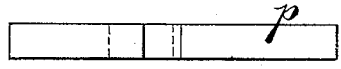
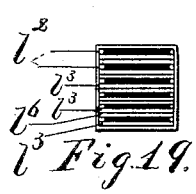
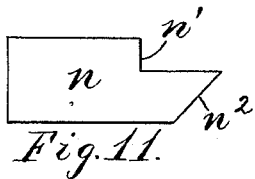
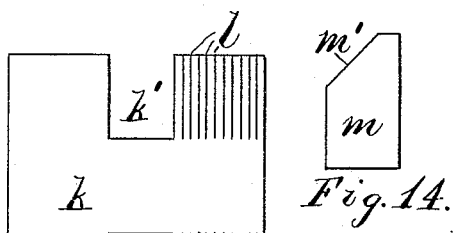
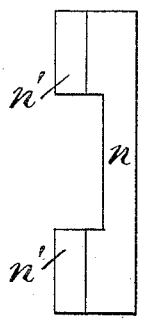
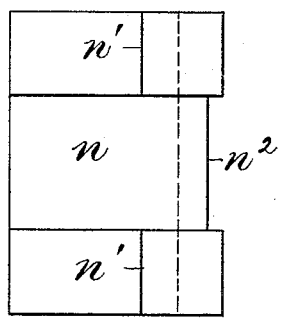
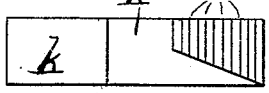
Attest:
L. Lee.
F. C. Fischer.
Inventor.
William Baxter, Jr.,
per Crane & Miller, Attys (Model.)

W. BAXTER, Jr.
ELECTRIC SHUNTING DEVICE.

No. 384,116. Patented June 5, 1888.

Attest:
L. Lee.
H. J. Miller.

Inventor.
William Baxter, Jr.,
per Crane & Miller, Attys.

United States Patent Office.

WILLIAM BAXTER, JR., OF BALTIMORE COUNTY, ASSIGNOR TO THE BAXTER ELECTRIC MANUFACTURING AND MOTOR COMPANY, OF BALTIMORE, MARYLAND.

ELECTRIC SHUNTING DEVICE.

SPECIFICATION forming part of Letters Patent No. 384,116, dated June 5, 1888.

Application filed August 20, 1887. Serial No. 247,418. (Model.)

*To all whom it may concern:*

Be it known that I, WILLIAM BAXTER, Jr., a citizen of the United States, residing in the Ninth election district of Baltimore county, State of Maryland, have invented certain new and useful Improvements in Electric Shunting Devices, fully described and represented in the following specification and the accompanying drawings, forming a part of the same.

The object of this invention is to furnish a more durable, reliable, and compact construction for connecting the terminals of shunt-circuits or various points of a direct circuit in a system in which it is necessary to cut in or out various portions of the direct circuit between connecting-points with great frequency; and the invention is particularly adapted for operation with a governor, which in the case of an electric motor may be actuated by centrifugal force, or in the case of a dynamo-electric machine by a magnet affected by either the volume or electro-motive force of the current, as required.

My construction requires a series of yielding springs held with their flat sides adjacent, so that, while insulated from one another, they may still have such proximity that a small movement of the block may effect a contact with the succeeding spring.

Heretofore a sliding block has been arranged to operate between brushes sustained in brush-holders upon opposite sides of the block, the brushes having separate electrical connections, as desired. A series of contact-springs projected inward from an annular seat has also been used in connection with a rotary connector consisting in a disk or segment of a disk fitted under the free ends of the spring and pressing them upward when in contact therewith. Neither of these constructions is adapted to sustain the series of yielding contact-pieces in close proximity to one another so as to form electrical connections with a sliding block having a short stroke. I therefore disclaim such constructions as not adapted to the purposes of my invention.

My construction may thus be used for automatically regulating the electric current produced by a dynamo, or for regulating the power of an electric motor running at a uniform velocity in conformity with the work thrown upon it.

Figure 21:
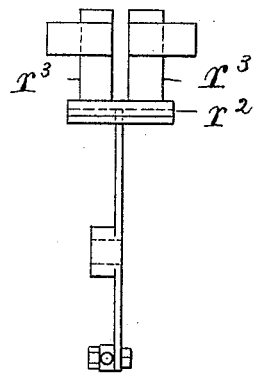
Figure 22:
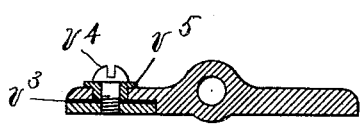

My invention may be constructed in a variety of forms, three of which are shown herein, Figure 1 representing a side elevation of a shunt-box adapted for an electric motor. Fig. 2 is a plan of the same with the cap omitted and the shunt-springs removed from the slits at one side. Fig. 3 is a transverse section of the same on line $x\ x$ in Fig. 1. Figs. 4 and 5 are a plan and end view of the shunt-block; Figs. 6 and 7, a plan and side view of the cheek-pieces for the same shunt-box. Figs. 8 and 9 are a plan and side view of the spring guide or holder. Figs. 10 and 11 are a plan and side view of the cap for the spring-holder; Fig. 12, an end view of the same, and Figs. 13 and 14 are a plan and end view of the spring-abutment. Fig. 15 is a diagram showing the shunt-springs arranged to press upon opposite faces of a sliding shunt-block. Fig. 16 is a diagram showing the shunt-block formed of two metallic sectors movable together about the same pivot, and having their curved faces fitted to two series of shunt-springs arranged concentric with their common pivot. Fig. 17 is a plan, and Fig. 18 an edge view, of the springs $l'$, elbows $l^2$, and connections $l^3$; and Fig. 19 is a section on line $x\ x$ in Fig. 18. Fig. 20 is a diagram showing a single-sector shunt-block in side view. Fig. 21 shows the block with two sets of springs arranged adjacent to its face to be electrically connected thereby; and Fig. 22 is an end view, and Fig. 23 a plan, of a shunt-block having one of its sides insulated from the center part, by which it is moved. Figs. 1 to 3, inclusive, represent a shunt-box having two series of springs formed of flat metallic strips inserted in notches formed in the opposite edges of a spring-holder and projected above the top of such spring-holder in the path of a shunt-block, which is adapted to make an electrical connection between the ends of the opposed pairs of springs when moved over the ends of both series.

The shunt-box shown in Figs. 1, 2, and 3 is formed of several pieces of wood or other insulating material inserted in a brass frame, L', adapted to bolt upon the heads of the pole-pieces in an electric motor, as is shown in my co-pending patent application, No. 247,907, filed August 26, 1887, representing an electric motor with such shunt-box attached. The brass casting L' is shown provided with bolt-holes $L^2$ to secure it to the heads of the pole-pieces.

$k$ is the spring-holder, formed of a rectangular block having square notches $k'$ in its opposite edges, and two series of transverse slits, $l$, formed in its edges adjacent to the notches.

$m$ is an abutment extended across the end of the spring guide or holder adjacent to both series of slits, and provided with an inclined top, $m'$, extended above the guide or holder $k$.

$n$ is a cap fitted over the notches $k'$ of the holder to form a seat for the shunt-block $o$, which is constructed to lie across the top of the cap in the rear of the springs, or to move over the same toward the inclined top of the abutment $m$, as shown in Fig. 1.

Stops $n'$ are projected from the cap $n$, to arrest the block $o$ when retracted from the springs, and the edge $n^2$ of the cap adjacent to the springs is inclined parallel with the top of the abutment.

Connectors of sheet metal formed with spring ends $l'$ and elbow-pieces $l^2$ are laid within the notches $k'$ on top of one another, and their spring ends bent upward at right angles to fit successively within the notches $l$.

The free ends of the springs project above the spring guide or holder and the cap, and are bent parallel with the abutment and end of the cap, so as to stand in an inclined position in relation to the path of the shunt-block. The last spring in each series is made larger than the others, and lies against the sloping face of the abutment $m$. This is not essential, but is desirable, as in most cases it not only forms a stop to prevent the shunt-block from moving too far, but also enables the block to press hard against the last spring-connection, which is sometimes necessary to wholly shunt the current from the magnets. The group of elbows $l^2$ forms a square bundle of conductors, as shown in Fig. 19, and cheek-pieces $p$ provided with notches $p'$, to fit over the bundles at the opposite sides of the holder $k$ and cap $n$, to retain the bent springs $l'$ in the slits $l$. In Fig. 17 the connectors are shown with the spring ends $l'$ straight out and the elbows $l^2$ connected with the connections $l^3$. These connections are shown as strips of metal laid upon the elbows $l^2$, and would be pressed together with intermediate layers of paper, $l^6$, or suitable insulating material (shown in Figs. 18 and 19 only) by means of a clamp, $l^4$, and screws $l^5$. (Indicated in dotted lines in Figs. 2 and 3.) All the constructive features hitherto described are applicable to the shunt-box shown in Figs. 1 and 2, in which one side only of the shunt-block is pressed upon the spring ends of the connectors, and therefore requires some means to resist the pressure of the springs and hold the block firmly against them to make a perfect electrical connection.

The block $o$ is shown in Figs. 1 and 3 clamped upon a rod, $o'$, which would be connected with a governor, if desired, and the rod is shown extended beneath a roller, $q$, mounted in stand $q'$ upon the frame L', the stand being vertically adjustable upon the frame by the set-screw $q^2$, to regulate the pressure of the block upon the springs. In such case the two series of connectors would be sustained side by side, as in the slits $l$ in the adjacent edges of the spring-holder $k$; but the essential principle of my invention, which is the actuation of a movable block in contact with the yielding ends of a series of springs, may be embodied in a construction having the ends of the springs arranged in any other manner adapted for the block to press successively upon them. Thus in Fig. 15 the ends of the two series of springs are shown at $l^7$ inclined toward one another, and the block $o^7$ forced between such ends in opposition to the elasticity of both, the required pressure of the block to make a perfect electrical contact with the springs being thus effected by the reaction of the opposed springs.

Another arrangement is shown in Fig. 16, in which two metallic sectors, $r\ r'$, are shown attached to a pivoted arm, $s$, movable around a fulcrum, $s'$, and provided with a crank, $s^2$, to oscillate it either by the direct application of the hand or by a rod, as $s^3$, for actuating it automatically. Two series of springs, $s^4$, are shown arranged in guides or holders $s^5$ adjacent to the two sectors, and the latter are shown in contact with the first spring of each series to form an electrical connection between the same.

If desired, the sector at the right-hand side of the dotted line $z\ z$ may be omitted and two series of springs be sustained adjacent to the sector $r$ and operate with one sector in the same manner as the two series of springs $l'$. Such a construction is shown in Fig. 20, in which a single sector, $r^2$, is shown pivoted upon a fulcrum and provided with a crank and rod to actuate it, as in Fig. 16, and Fig. 21 shows two sets of springs, $r^3$, arranged in contact with its face, by which they would be electrically connected, as well as by the two connected sectors shown in Fig. 16.

From the above description it will be seen that the shunting device is adapted to operate with various kinds of circuits, or any series of electrical connections which may be joined by the springs and block I employ. The springs may therefore be attached to various points of a single circuit, the arrangement of the connections being immaterial when the circuit is about the poles of a magnet and depending entirely upon the way the magnet is wound—that is, in series, shunt, multiple-shunt, or some of the various combinations of series and shunt— and also whether a part or the whole of the circuit around the magnets is to be affected by the shunting device.

The special form of elbow-connections embodied in the connectors having spring ends $l'$ and elbows $l^2$ is applicable especially to constructions where the main connections $l^3$ approach the shunt-box at right angles to the path of the shunt-block; but the generic claims herein are intended to cover other and different constructions.

Figure 23:
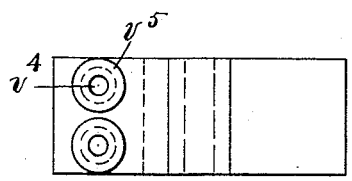

All the description above given refers to arrangements where there are two sets of springs side by side or opposite one another, so that the movement of a single shunt-block will cut the circuits in or out, if required. This arrangement is the most desirable in the case of motors or dynamo-electric machines, as by that means all the connections coming from one side of the machine can be put in one series, and those from the other side in a corresponding series parallel to it. It may not in all cases, however, be desirable to have an electrical connection between the two sets of connections, as would be the case if the armature were placed in circuit between the magnet-coils. In such cases I would make the shunt-block with its ends insulated from each other, as shown in Figs. 22 and 23, in which one end of the block is shown insulated from the body of the block by an insulator, $v^3$, and attached to the block by screws $v^4$ bearing upon insulated bushings and washers $v^5$.

In some particular forms of motors or dynamos, and of resistance-boxes or other devices where a switch-board is used, only one set of springs would be necessary, as there would be only a single system of resistance or short circuits to act upon; but in any case the device, as explained, will act perfectly, for it will be noticed that if the shunt-block is made long enough to make connection between all the springs, (that is, longer than the distance between the first and last springs,) it will connect all the springs it covers and make short circuit, as desired. It is thus adapted to take the place of a switch in an ordinary switch-board, and might perform the desired functions if only wide or long enough to cover a few springs at once. In such case, however, its rear end should be beveled to keep it from catching upon the ends of the springs when moved backward, as is indicated in Fig. 1.

In all the constructions described it will be noticed that the springs are formed of flat strips of sheet metal, and their flat sides are held adjacent to one another, so that the springs bend toward one another when pressed by the sliding block, but their projection into the path of the block is so proportioned to the space between them that the springs are not pressed into contact with one another when thus moved.

It is obvious that the closer the springs are held in proximity to one another the less is the movement required for the sliding block.

Where the sliding block is operated by a governor the springs would therefore be arranged with their front sides as close together as would effect proper insulation and avoid their accidental contact with one another; but for other purposes the springs might be placed at any suitable distance apart.

Having distinguished my invention from those which have heretofore been used, I claim the same as follows:

1. In an electrical shunting device, the combination, with the different sections of the electric circuit, of a series of yielding springs formed of flat metallic strips, a holder to sustain such springs with their flat sides adjacent, and a movable metallic block arranged and operated to move in succession over the yielding ends of the springs, as and for the purpose set forth.

2. In an electrical shunting device, the combination, with the different sections of the electrical circuit, of a series of yielding springs consisting of flat metallic strips connected with such sections, a spring guide or holder formed with a series of adjacent slits to sustain the yielding springs with their flat sides in proximity, and a movable block arranged and operated to press in succession upon the yielding ends of said springs, as and for the purpose set forth.

3. In an electrical shunting device, the combination, with the different sections of the electrical circuit, of two series of yielding springs consisting of flat metallic strips connected with such sections, a spring guide or holder formed upon its opposite edges with two series of adjacent slits to sustain the yielding springs with their flat sides in proximity, and a movable block arranged and operated to press in succession upon the yielding ends of said springs to connect the springs of the opposed series electrically, as and for the purpose set forth.

4. In an electrical shunting device, the combination, with the different sections of the electrical circuit, of two series of yielding springs consisting of flat metallic strips connected with such sections, a spring guide or holder formed upon its opposite edges with two series of adjacent slits to sustain the yielding springs with their flat sides in proximity, and a movable block arranged and operated to press in succession upon the yielding ends of said springs to connect the springs of the opposed series electrically, and a stop upon the spring guide or holder to arrest the movement of the movable block when retracted from contact with the series of springs, as and for the purpose set forth.

In testimony whereof I have hereunto set my hand in the presence of two subscribing witnesses.

WM. BAXTER, JR.

Witnesses:
C. R. GALLAGHER,
HENRY S. THOMPSON.